US010064032B2

(12) United States Patent
Kim et al.

(10) Patent No.: US 10,064,032 B2
(45) Date of Patent: Aug. 28, 2018

(54) METHODS AND APPARATUS FOR PROVIDING APPLICATION-SPECIFIC MESSAGING OVER A GLOBAL SYSTEM FOR MOBILE WIRELESS COMMUNICATION SYSTEM (75) Inventors: Dae Seong Kim, Campbell, CA (US); Syed Zaeem Hosain, San Jose, CA (US)

(73) Assignee: AERIS COMMUNICATIONS, INC., San Jose, CA (US)

( * ) Notice: Subject to any disclaimer, the term of this patent is extended or adjusted under 35 U.S.C. 154(b) by 0 days.

(21) Appl. No.: 11/255,728

(22) Filed: Oct. 20, 2005

(65) Prior Publication Data

US 2006/0099941 A1 May 11, 2006

Related U.S. Application Data (60) Provisional application No. 60/621,167, filed on Oct. 22, 2004.

(51) Int. Cl.
*H04W 4/20* (2018.01)
*H04W 4/16* (2009.01)

(52) U.S. Cl.
CPC ............... *H04W 4/20* (2013.01); *H04W 4/16* (2013.01)

(58) Field of Classification Search
USPC .......... 455/414.1, 419, 423, 515, 456.1–457, 455/466, 445, 417
See application file for complete search history.

(56) References Cited

U.S. PATENT DOCUMENTS

| 5,546,444 | A | | 8/1996 | Roach et al. | |
| 5,845,203 | A | * | 12/1998 | LaDue | H04L 12/2818 455/414.1 |
| 5,889,474 | A | | 3/1999 | LaDue | |
| 5,966,653 | A | | 10/1999 | Joensuu et al. | |
| 6,144,859 | A | | 11/2000 | LaDue | |
| 6,295,454 | B1 | * | 9/2001 | Havinis et al. | 455/456.3 |
| 2002/0193127 | A1 | | 12/2002 | Martschitsch | |
| 2003/0037155 | A1 | * | 2/2003 | Lee | 709/230 |
| 2003/0133423 | A1 | * | 7/2003 | LaDue | 370/330 |
| 2004/0248563 | A1 | * | 12/2004 | Ayers et al. | 455/417 |
| 2006/0094467 | A1 | * | 5/2006 | Kim et al. | 455/558 |

FOREIGN PATENT DOCUMENTS

WO   WO 99/48308   9/1999

OTHER PUBLICATIONS

"ETSI EN 300 918 V7.1.2, Digital cellular telecommunications system (Phase 2+)", *General on supplementary services* (GSM 02.04 version 7.1.2 Release 1998). (Dec. 1999), 1-23.
"WAP over GSM USSD", *Wireless Application Protocol—WAP over GSM USSD Specification*, (Jul. 15, 1997).

* cited by examiner

*Primary Examiner* — Marisol Figueroa
(74) *Attorney, Agent, or Firm* — Brundidge & Stanger, P.C.

(57) ABSTRACT

Methods and apparatuses for transmitting application-specific data over a control channel of a GMS telecommunications system. In one embodiment of the invention the application-specific data is transmitted from an application device to a central monitoring station in the content field of a register_ss message. In one embodiment of the invention, application-specific data is transmitted from a central monitoring station to an application device in the calling party number field of a caller identification message.

14 Claims, 6 Drawing Sheets

METHODS AND APPARATUS FOR PROVIDING APPLICATION-SPECIFIC MESSAGING OVER A GLOBAL SYSTEM FOR MOBILE WIRELESS COMMUNICATION SYSTEM

CROSS REFERENCE TO RELATED APPLICATION

This application claims the benefit of U.S. provisional patent application No. 60/621,167 entitled "Methods and Apparatus for Providing Application-Specific Messaging Over a Global System for Mobile Wireless Communication System", filed Oct. 22, 2004.

FIELD

Embodiments of the invention relate generally to the field of wireless data transmission, and more specifically to methods for providing application-specific data (ASD) over a Global System for Mobile (GSM) wireless communication system.

BACKGROUND

Wireless telemetry systems use a wireless (e.g., radio frequency) communications network to allow the measurement of information by remote devices and the transmission of the measured information to a central monitoring station (CMS). Typical wireless telemetry systems also enable the control of a remote device through the counter part of telemetry, telecommand.

In general, telemetry systems are employed for the purpose of monitoring environmental conditions or equipment parameters. Such systems are employed in a wide variety of applications including security, health monitoring, vehicle and asset tracking, and device and equipment monitoring and control.

A typical telemetry system includes a number of remote measuring devices, an encoder for encoding the measurements as analog or digital communication signals, and a transmission means for transmitting the communication signals.

For many telemetry applications it is critical that information obtained by the remote devices be transmitted to the monitoring system quickly. For example, if security alarm information or health status information is not transmitted quickly it may be not only useless, but detrimental as well. Therefore, for a telemetry system to be effective, it should be able to communicate data between remote devices and the monitoring station quickly.

Some telemetry systems use a wireless telecommunications system to transmit the telemetry application data. If the traffic channel of the system is used for data transmission, it can result in undesirable delay. That is, the delay associated with setting up a call to transmit the telemetry application data may be excessive for some applications.

This problem has been addressed in the context of the communication systems using the Advanced Mobile Phone Service (AMPS) standard. U.S. Pat. No. 5,845,203 to Ladue ('203 patent) describes a method for communicating ASD (e.g., telemetry application data) over a control channel of a wireless communication network. ASD from a remote device is encoded in a stream of dialed digits along with a remote feature control request (RFCR).

The RFCR function provided in AMPS allows a roaming cell phone to invoke a feature (e.g., speed dialing) from a home location register (HLR) associated with the local (home) Mobile Switching Center (MSC) to which the cell phone is assigned.

The RFCR is placed in the dialed digits stream accompanying a call origination message initiated by the roaming cell phone. The serving MSC in the visiting cellular service area, upon receiving the call origination message and detecting the RFCR in the accompanying dialed digits stream, forwards the RFCR over a nationwide cellular radio telecommunications intersystem network (e.g., a signaling system 7 (SS7) network), to the HLR associated with the roaming cell phone's home MSC.

The system described in the '203 patent exploits the RFCR to transmit ASD from the remote device to the CMS. The remote device is assigned a Mobile Identification Number (MIN) so that it appears as a roaming cell phone to a local MSC. The local MSC then, acts as the serving MSC for remote device. The area code specified in the assigned MIN is selected so that the CMS functions as the HLR associated with the home MSC for the remote device. The CMS further appears as a service control point (SCP) on the SS7 network to receive the RFCR and ASD automatically forwarded by the serving MSC.

This is effected as follows. An RFCR is placed in the dialed digits stream accompanying a call origination message initiated by the wireless communicator. Additionally, ASD is also placed in the dialed digits stream. The call origination message and dialed digits stream is transmitted over a control channel to the serving MSC. The serving MSC receives the call origination message and associated dialed digits stream, and detects the RFCR, triggering the serving MSC to forward the dialed digits stream, including the RFCR and the application-specific data, over the SS7 network, to the CMS/SCP.

This scheme provides several advantages including widespread geographic and infrastructure applicability, no need to access the traffic channel (low cost), no need to modify the serving MSC hardware or software.

However, the scheme is not without disadvantages and a significant one is that it is limited to communication systems employing standards that provide the specific "feature access request" function (i.e., AMPS). Moreover, the interpretation of feature requests may vary from carrier to carrier. For example, "*74" may be interpreted to signify a call-forwarding message by a particular carrier, but such interpretation is not specified by the standard and therefore a different carrier may have a different interpretation.

One widely-used digital wireless communications standard that does not provide the AMPS feature access request functionality is GSM. One method of transmitting the ASD in GSM communication networks is via the short message system (SMS). This method is disadvantageous in that the message is transmitted over the network traffic channel. Such methods are costly and slow as they invoke airtime charges and they require call setup prior to transmission of the message as well as call teardown afterwards.

What is needed is a method for transmitting ASD over a control channel of a GSM communications network.

SUMMARY

A method for transmitting application-specific data over a control channel of a GMS telecommunications system. In one embodiment of the invention the application-specific data is transmitted from an application device to a central monitoring station in the content field of a register_ss message. In one embodiment of the invention, application-specific data is transmitted from a central monitoring station to an application device in the calling party field of a caller identification message.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Embodiments of the invention provide methods and apparatuses for communicating ASD over the control channel of a GMS telecommunications system. For one embodiment of the invention the ASD is transmitted in the content field of a register_ss message. For various alternative embodiments of the invention, the register_ss message used may be any of a number of call forwarding messages such as a call forwarding unconditional (CFU) message, a call forwarding on mobile subscriber busy (CFB) message, a call forwarding on no reply (CFNRy) message, and a call forwarding on mobile subscriber unreachable (CFNRc). For one embodiment of the invention, application-specific data is transmitted from a central monitoring station to an application device in the calling party number field of a caller identification message.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Figure 1:
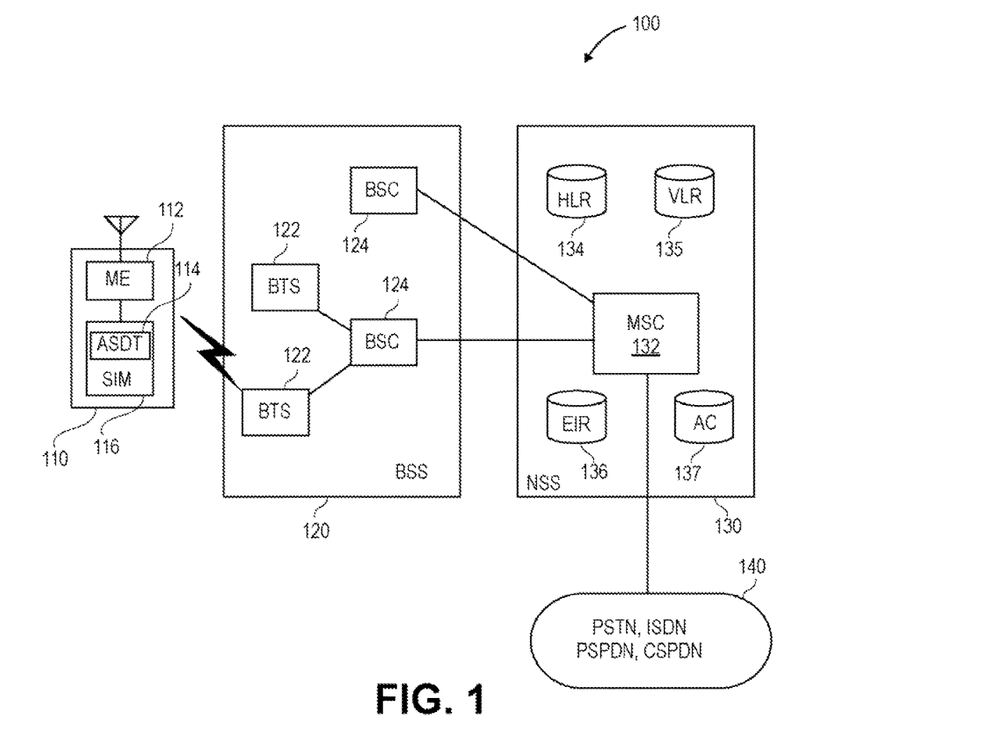
FIG. 1 illustrates a portion of a GMS telecommunication network in accordance with one embodiment of the invention.

FIG. 1 illustrates a portion of a GMS telecommunication network in accordance with one embodiment of the invention. Network 100, shown in FIG. 1 includes a mobile station 110. The mobile station 110 includes the mobile equipment (transceiver) 112. In accordance with one embodiment of the invention the mobile equipment 112 is communicatively coupled to a telemetry application device (not shown). In accordance with alternative embodiments of the invention the mobile equipment 112 may be coupled to any application device for which ASD may be transmitted. For one embodiment of the invention, application-specific data-transmitting (ASDT) functionality 114 is included with the mobile equipment 112. In one such embodiment, the ASDT functionality 114 is programmed in firmware within the mobile equipment 112. For alternative embodiments, the ASDT functionality 114 may be implemented in any type of machine-readable media.

The mobile station 110 also includes a subscriber identity module (SIM (SIM card)) 116. The SIM card 116 contains the subscriber identity information allowing the subscriber to be identified by the network. This allows the subscriber access to subscribed services irrespective of the specific mobile equipment. That is, by inserting the SIM card into another GSM terminal, the user is able to transport services to that terminal (e.g., placing and receiving calls as well as other subscribed services). The SIM typically stores a security key to protect against unauthorized use. In accordance with an alternative embodiment of the invention, the ASDT functionality is included in the SIM as described in related U.S. patent application Ser. No. "TBD", entitled "Methods and Apparatuses for Implementing Telemetry Applications on a Subscriber Identity Module", filed on "Oct. 22, 2004".

The mobile station 110 communicates with the base station subsystem (BSS) 120 via a GSM-compatible transmission format (ETSI). BSS 120 includes a number of base transceiver stations (BTSs) 122. The BTSs 122 comprise the radio transceivers that define a cell of the network, as well as handle the radio-link protocols with the mobile station 110. The BSS 120 also includes a number of base station controllers (BSCs) 124 that manage the radio resources for one or more BTSs 122. The BSCs 124 effect such operations as radio-channel setup, frequency hopping, and handovers. As shown in FIG. 1, the BSCs 124 connect the mobile station 110 to the mobile switching center (MSC) 132 of network subsystem (NSS) 130. The MSC 132 provides the functionality for handling a mobile subscriber including registration, authentication, location updating, handovers, and call routing to a roaming subscriber. The MSC 132 also provides connection to the fixed networks 140 (shown for example, as PSTN, ISDN, PSPDN, and CSPDN).

The MSC 132 provides its services in conjunction with a number of functional entities including the home location register (HLR) 134, and the visitor location register (VLR) 135 which, together with the MSC 132 provide call-routing and roaming capabilities. The HLR maintains the current location of the mobile station along with administrative information for each registered subscriber of the GSM network.

The VLR 135 contains information to control and provision services for each mobile station located within the geographical area controlled by the VLR 135.

The equipment identity register (EIR) 136 contains a list of all valid mobile equipment on the GSM network. Each mobile station is identified in the EIR 136 by a unique mobile equipment identifier. The authentication center (AC) 137 stores a copy of the security key stored on each subscriber's SIM, which is used for authentication and encryption over the security channel.

The GSM network employs two channel types; traffic channels (TCHs) used to transmit speech and data, and control channels (CCHs) used for signaling. The control channels include the broadcast control channel (BCCH), frequency correction channel (FCCH), synchronization channel (SCH), paging channel (PCH), random access channel (RACH), and access grant channel (AGCH).

The BCCH broadcasts such data as base station identifier, frequency allocations, and frequency-hopping sequences on the downlink.

The FCCH and SCH are used to synchronize the mobile station to the time slot of a cell.

The PCH is used to alert the mobile station of an incoming call.

The RACH is used by the mobile station to request access to the network including requests for supplementary services (SS). Supplementary services modify (supplement) basic telecommunication service. When the mobile station transmits an SS request the system assigns a standalone dedicated control channel (SDCCH) to the mobile station for access to the network. The AGCH is used to allocate the SDCCH to the mobile station for signaling (to obtain a dedicated channel) upon receiving the mobile station's SS request. For one embodiment the SDCCH used for signaling is an eighth-rate TCH (CCH). In accordance with one embodiment of the invention, ASD from an application device is transmitted within an SS message on the allocated SDCCH as described more fully below.

Figure 2:
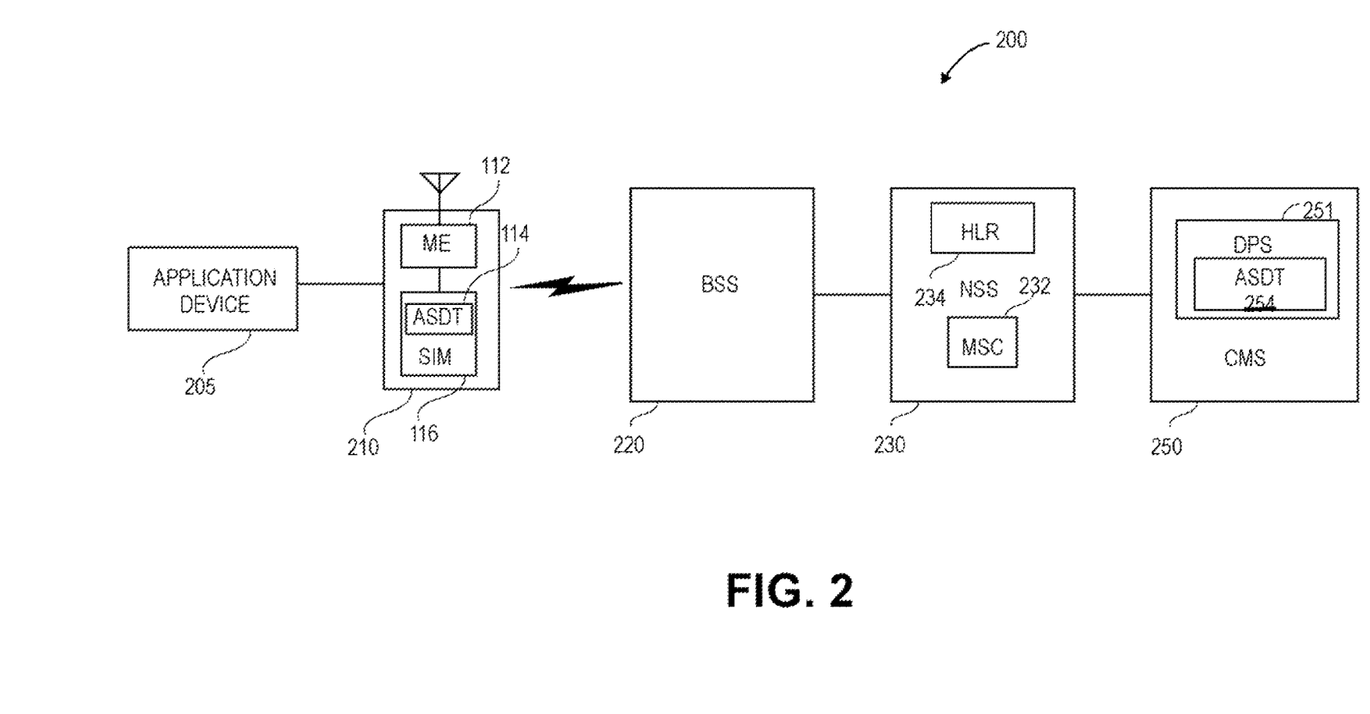
FIG. 2 illustrates a system for transmitting ASD on a control channel of a GSM communication system in accordance with one embodiment of the invention.

FIG. 2 illustrates a system for transmitting ASD on a control channel of a GSM communication system in accordance with one embodiment of the invention. System 200, shown in FIG. 2 includes an application device 205 which may be, for a variety of alternative embodiments, a telemetry application device. Application device 205 is coupled to mobile station 210. Though illustrated as directly linked, it is appreciated that application device 205 may communicate data to mobile station 210 through indirect links including but not limited to broadcasted wireless signals, network communications or any medium through different devices may communicate such as the Internet, a wide area network (WAN), a local area network (LAN), an intranet, or the like.

The application device 205 communicates ASD data to the mobile station 210. The mobile equipment 112 of mobile station 210 includes ASDT functionality 114. The ASDT functionality 114 encodes the ASD as an SS message and transmits it through the BSS 220 to the NSS 230 on an allocated SDCCH. The MSC 232 receives the SS message and invokes the appropriate interface message. The SS message is then forwarded to the HLR.

The GSM mobile application port (MAP) (GSM_MAP) sends the SS message using a MAP_Register_SS message to the HLR 234. Software in the HLR 234 understands the GSM_MAP.

The HLR receives the SS message, formats the message in a desired transmission protocol and forwards the data to the CMS 250. That is, software on the HLR converts the message from the SS message format to, for example, TCP/IP format. The message may be communicated through direct or indirect communication links as exemplified above. The CMS 250 may include a digital processing system (DPS) 251 for processing (e.g., decoding) the received message to obtain the ASD. DPS 251 may also include ASDT functionality 254 for transmitting ASD from the CMS 250 to the application device 205. The CMS 250 may communicate the ASD to external systems (not shown) for additional processing or actions.

For one embodiment of the invention the transmission of the ASD from the application device to the CMS and beyond to external systems is effected in general within 10-15 seconds, and often quicker. This is a tremendous improvement over many conventional ASD transmission schemes (e.g., SMS, e-mail, etc.). Moreover, GSM provides an acknowledgement of receipt of the message from the message transmission destination to the message transmission source. Such acknowledgement is not automatic in typical schemes.

Figure 3:
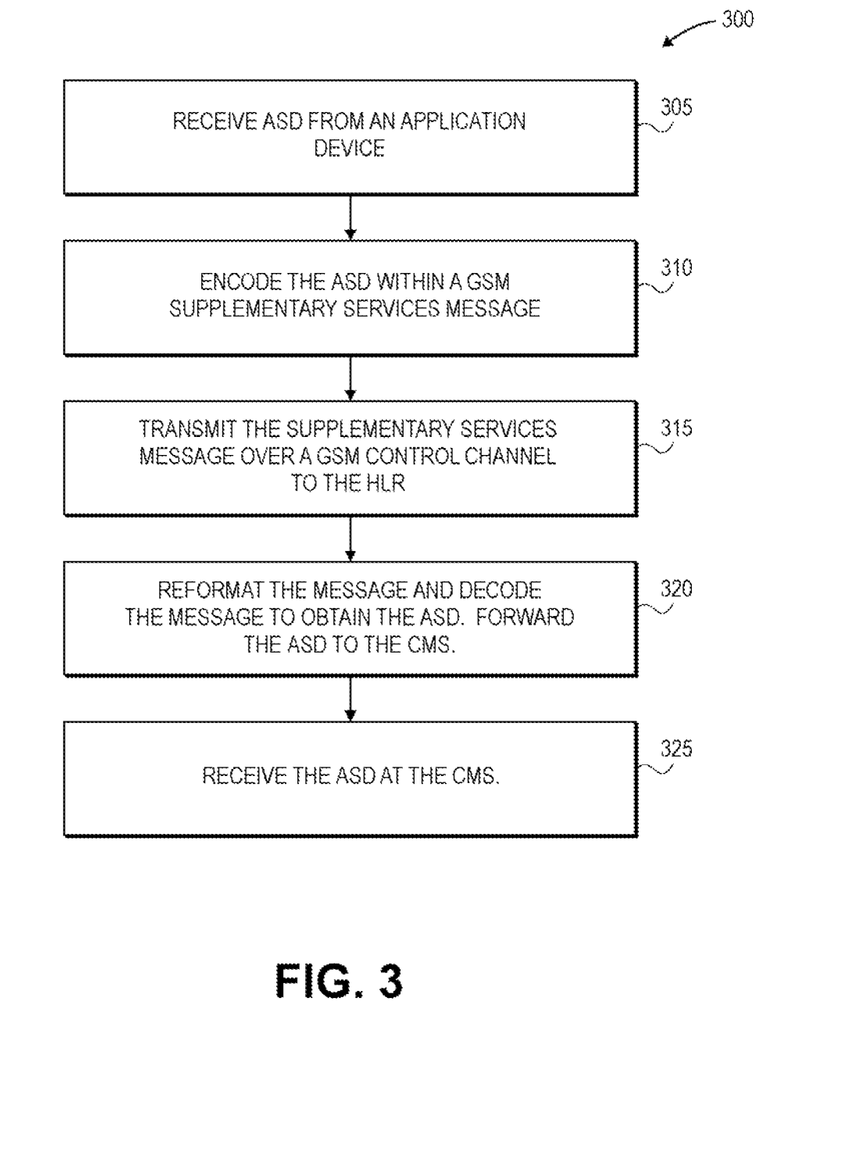
FIG. 3 illustrates a process by which ASD is transmitted from an application device to a CMS using a GSM communications system in accordance with one embodiment of the invention.

FIG. 3 illustrates a process by which ASD is transmitted from an application device to a CMS using a GSM communications system in accordance with one embodiment of the invention. Process 300 begins at operation 305 in which ASD is obtained from an application device. The application device may be a telemetry applications device in accordance with one embodiment of the invention. For example, the application device may be part of a vehicle tracking system.

At operation 310 the ASD is encoded within a GSM supplementary service message. For one embodiment of the invention in which the GSM supplementary service message is a register_ss call forwarding message, the ASD is encoded as the "forward-to-number" portion of the register_ss call forwarding message as described more fully below.

At operation 315 the register_ss message containing the ASD is transmitted over a GSM control channel. For one embodiment, ASD encoded within a register_ss message is sent over the SDCCH.

At operation 320 the register_ss message is detected at the HLR. The message is then reformatted to a desired transmission format and transmitted to the CMS.

At operation 325 the message is received at the CMS where it is decoded to obtain the ASD.

In accordance with one embodiment of the invention a supplementary service is selected for encoding the ASD. GSM includes a number of supplementary services (e.g., forwarding, call barring, call hold, call waiting, etc.). Not all supplementary services have available fields for transporting the ASD. For one embodiment of the invention the call forwarding supplementary services are used because they provide the largest available field for transporting the ASD. GSM provides the following call forwarding services.

CFU—all incoming calls for the specified services will be forwarded without being offered to the mobile subscriber.

CFB—when the mobile subscriber is busy, all incoming calls for the specified services will be forwarded without being offered to the mobile subscriber.

CFNRy—all incoming calls for the specified services that are not answered within a defined period will be forwarded.

CFNRc—all incoming calls for the specified services when the mobile subscriber is not reachable will be forwarded without being offered to the mobile subscriber.

Figure 4:
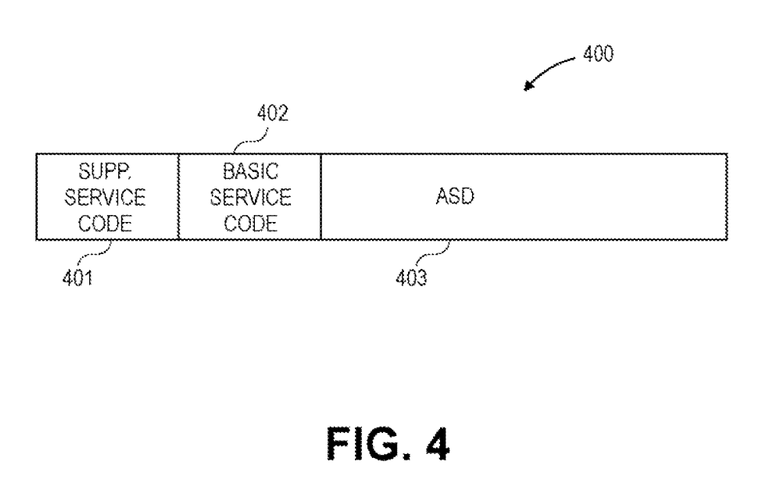
FIG. 4 illustrates the use of a call forwarding message to transport ASD in accordance with one embodiment of the invention.

FIG. 4 illustrates the use of a call forwarding message to transport ASD in accordance with one embodiment of the invention. Message format 400, shown in FIG. 4, applies generally to all of the call forwarding services. As shown in FIG. 4, message format 400 includes a supplementary service code 401, a basic service code 402, and a content field 403. For example, the supplementary service code 401 may be "*61" indicating a CFU message. The basic services code 402 may be "*11" indicating telephony. The content field 403 contains a number of digits (e.g., 15) used to indicate the forward-to-number of a call forwarding message. In accordance with an embodiment of the invention, the content field 403, which would typically contain the forward-to-number of the call forwarding message, contains instead the ASD received from the application device.

In accordance with one embodiment of the invention, one or more of the content field digits is used to provide a transport check to distinguish between an actual call forwarding message and a call forwarding message encoded with ASD. In an alternative embodiment of the invention, all of the digits of the content field may be used to transport ASD, with calls distinguished based on the MIN.

In accordance with one embodiment of the invention, ASD may be transmitted form the CMS to the application device over a GSM control channel. For one embodiment the ASD is included as the calling party number (CPN) of a GSM provide roaming number request (PRNR).

When a mobile station that has roamed into new service area is called, the MSC providing service to that area associates a mobile subscriber roaming number (MSRN), from its available pool, with that mobile station. This association is effected dynamically, and only for a limited time (e.g., 30 seconds). So for example, there may be thousands of mobile stations in a service area of an MSC. Only the active mobile stations are assigned an MSRN. The MSRN is the telephone number at which the mobile station can presently be reached. The dynamic mapping of available telephone numbers to active mobile stations for each MSC is maintained by the VLR.

When a call is placed to a mobile station, a PRNR is initiated including the CPN. The serving MSC then assigns the MSRN and uses it to page the mobile station to alert the mobile station of an incoming call. The page includes the CPN which is provided to the mobile station to effect caller identification functionality.

In accordance with one embodiment of the invention, the ASD from the CMS is encoded within the CPN of the PRNR. The mobile station receives the ASD as the CPN of the incoming call. For one embodiment of the invention the MSRN is not actually dialed when the MSC provides the ASD.

Figure 5:
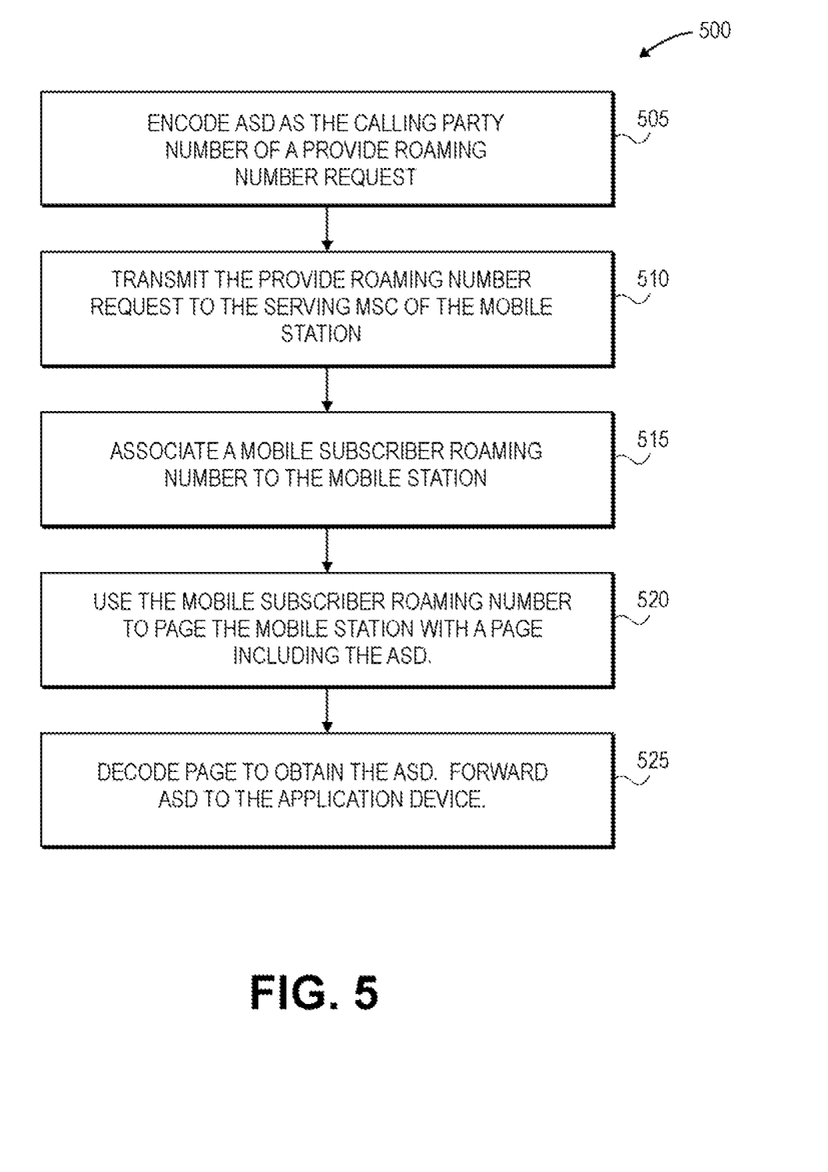
FIG. 5 illustrates a process by which ASD is transmitted from a CMS to a application device over a GSM control channel in accordance with one embodiment of the invention.

FIG. 5 illustrates a process by which ASD is transmitted from a CMS to an application device over a GSM control channel in accordance with one embodiment of the invention. Process 500, shown in FIG. 5, begins at operation 505 in which ASD is encoded as the CPN of a PRNR.

At operation 510 the PRNR is transmitted to the serving MSC of the mobile station. That is, the gateway MSC invokes the PRNR including the ASD encoded as the CPN.

At operation 515 the serving MSC of the mobile station associates an MSRN with the mobile station.

At operation 520 the MSRN is used to page the mobile station. The page includes the ASD (i.e., as the CPN) thus transmitting the ASD to the mobile station.

At operation 525 the mobile station decodes the CPN received to obtain the ASD, which is then communicated to the application device.

General Matters

Embodiments of the invention allow the transmission of ASD via the control channel of a GSM wireless network. For one embodiment the ASD is transmitted from an application device to a central monitoring station in the content field of a register_ss message. For one embodiment, ASD data is transmitted from a central monitoring station to an application device in the calling party number field of a caller identification message.

Embodiments of the invention have been described that include ASD in the call forwarding messages (e.g., CFU, CFB, etc.). In alternative embodiments of the invention, the ASD may be included in other supplementary services or in an unstructured supplementary service data (USSD) message.

Further, although embodiments of the invention have been described in terms transmitting telemetry application data, any ASD may be transmitted in accordance with alternative embodiments of the invention.

Figure 6:
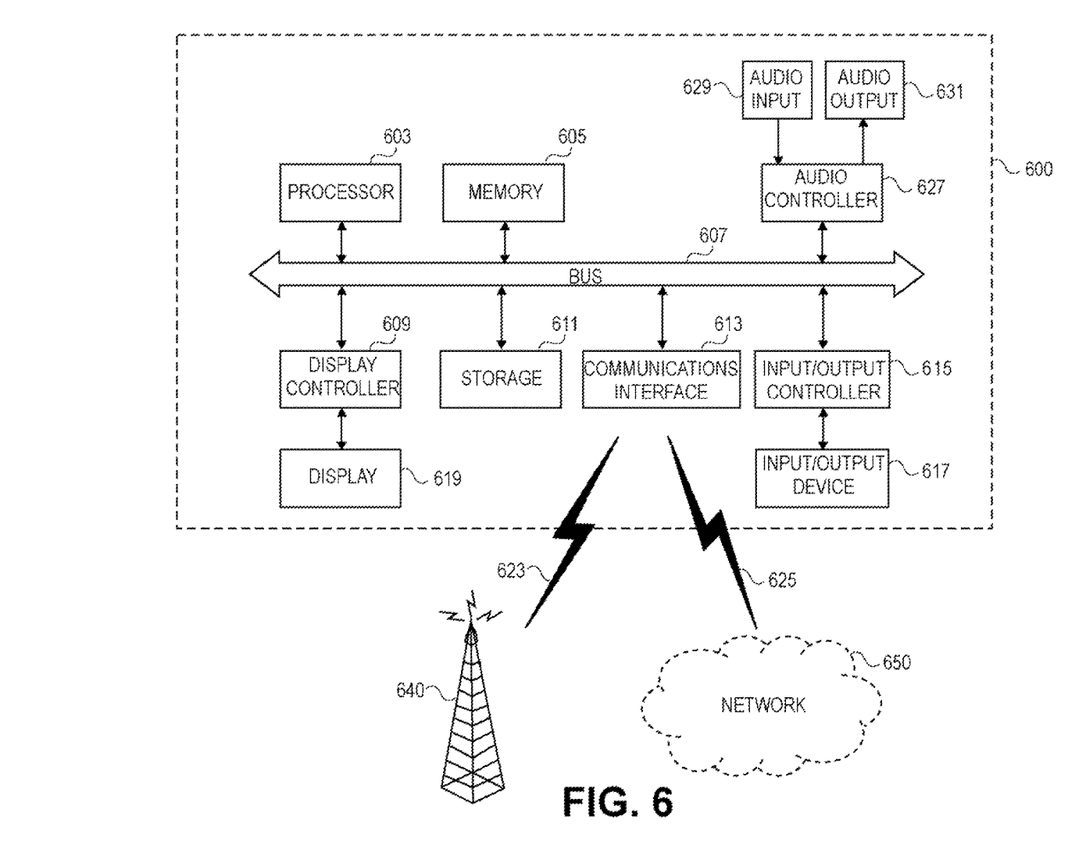
FIG. 6 illustrates a block diagram illustrating one embodiment of a DPS 601 that may be included within the central monitoring station in accordance with an embodiment of the present invention.

As described above in reference to FIG. 2, the central monitoring station may include a DPS. FIG. 6 illustrates a block diagram illustrating one embodiment of a DPS 601 that may be included within the central monitoring station in accordance with an embodiment of the present invention. For alternative embodiments of the present invention, DPS 601 may be a computer that includes a processor 603 coupled to a bus 607. In one embodiment, memory 605, storage 611, display controller 609, communications interface 613, input/output controller 615 and audio controller 627 are also coupled to bus 607.

DPS 601 interfaces to external systems through communications interface 613. Communications interface 613 may include a radio transceiver compatible with AM, FM, TV, wireless telephone signals or the like. Communications interface 613 may also include an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices.

For one embodiment of the present invention, a carrier wave signal 623 is received by communications interface 613 to communicate with antenna 640. In one embodiment of the present invention, carrier wave signal 625 is received/transmitted between communications interface 613 and network 650. In one embodiment of the present invention, a communications signal 625 may be used to interface DPS 601 with another computer system, a network hub, router or the like. In one embodiment of the present invention, carrier wave signals 623 and 625 can include signals representing machine readable data, and said carrier wave signals 623 and 625 can be transmitted through wires, cables, optical fibers or through the atmosphere, or the like.

In one embodiment of the present invention, processor 603 may be a conventional microprocessor, such as for example but not limited to an Intel x86 or Pentium family microprocessor, a Motorola family microprocessor, or the like. Memory 605 may be a machine-readable medium such as dynamic random access memory (DRAM) and may include static random access memory (SRAM). Display controller 609 controls in a conventional manner a display 619, which in one embodiment of the invention may be a cathode ray tube (CRT), a liquid crystal display (LCD), an active matrix display, a television monitor or the like. The input/output device 617 coupled to input/output controller 615 may be a keyboard, disk drive, printer, scanner and other input and output devices, including a television remote, mouse, trackball, trackpad, joystick, or the like. In one embodiment of the present invention, audio controller 627 controls in a conventional manner audio output 631, which may include for example audio speakers, headphones, an audio receiver, amplifier or the like. In one embodiment of the invention, audio controller 627 also controls in a conventional manner audio input 629, which may include for example a microphone or input(s) from an audio or musical device, or the like.

Storage 611 may include machine-readable media such as for example but not limited to a magnetic hard disk, a floppy disk, an optical disk, a smart card or another form of storage for data. In one embodiment of the present invention, storage 611 may include removable media, read-only media, readable/writable media or the like. Some of the data may be written by a direct memory access process into memory 605 during execution of software in computer system 601. It is appreciated that software may reside in storage 611, memory 605 or may be transmitted or received via modem or communications interface 613 by signals representing said software. For the purposes of specification, the term "machine readable medium" shall be taken to include, but is not limited to solid-state memories, optical and magnetic disks, and the like.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   obtaining application-specific data;
   encoding the application-specific data as a calling party number of a "provide roaming number request" (PRNR) of a Global System for Mobile (GSM) wireless communication system;
   transmitting the application-specific data over a control channel of the GSM wireless communication system; and
   calling a mobile station communicatively coupled to an application device such that a mobile subscriber roaming number is provided for the mobile station, and the mobile station is paged using a page including the application-specific data encoded as the calling party number.

2. The method of claim 1, further comprising:
   decoding the page to obtain the application-specific data.

3. The method of claim 1, wherein the application-specific data pertains to a telemetry application.

4. The method of claim 3, wherein the telemetry application is selected from the group consisting of security application, health monitoring application, vehicle tracking application and asset tracking application, and device monitoring and control application and equipment monitoring and control application.

5. The method of claim 2, further comprising:
   transmitting the application-specific data from the mobile station to the application device.

6. A system comprising:
   a processing system for encoding application-specific data as a calling party number of a provide roaming number request of a Global System for Mobile (GSM) wireless communication system and
   a communication link to a mobile switching center of the GSM wireless communication system for calling a mobile station communicatively coupled to an application device such that a mobile subscriber roaming number is provided for the mobile station, and the mobile station is paged using a page including the application-specific data encoded as the calling party number.

7. The system of claim 6, wherein the mobile station includes a means for decoding the page to obtain the application-specific data.

8. The system of claim 7, wherein the application-specific data pertains to a telemetry application.

9. The system of claim 8, wherein the telemetry application is selected from the group consisting of security application, health monitoring application, vehicle tracking application and asset tracking application, and device monitoring and control application and equipment monitoring and control application.

10. An article of manufacture comprising:
    a, non-transitory, computer-readable medium having instructions, wherein the instructions, when accessed, result in a processor performing operations comprising:
    obtaining application-specific data;
    encoding the application-specific data as a calling party number of a provide roaming number request of a Global System for Mobile (GSM) wireless communication system;
    transmitting the application-specific data over a control channel of the GSM wireless communication system; and
    calling a mobile station communicatively coupled to an application device such that a mobile subscriber roaming number is provided for the mobile station, and the mobile station is paged using a page including the application-specific data encoded as the calling party number.

11. The article of manufacture of claim 10, wherein the instructions further include instructions for:
    decoding the page to obtain the application-specific data.

12. The article of manufacture of claim 10, wherein the application-specific data pertains to a telemetry application.

13. The article of manufacture of claim 12, wherein the telemetry application is selected from the group consisting of security application, health monitoring application, vehicle tracking application and asset tracking application, and device monitoring and control application and equipment monitoring and control application.

14. The article of manufacture of claim 11, wherein the instructions further include instructions for:
    transmitting the application-specific data from the mobile station to the application device.

* * * * *